(12) United States Patent
Ho et al.

(10) Patent No.: US 10,184,028 B2
(45) Date of Patent: Jan. 22, 2019

(54) METHOD FOR PREPARING A POLYMER

(71) Applicant: INDUSTRIAL TECHNOLOGY RESEARCH INSTITUTE, Hsinchu (TW)

(72) Inventors: Po-Hsien Ho, Taipei (TW); Chih-Hsiang Lin, Taipei (TW); Meng-Hsin Chen, Xinpi Township (TW); Cheng-Hsing Fan, Tainan (TW); Hsin-Ching Kao, Baoshan Township (TW); Yih-Her Chang, Baoshan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/013,168

(22) Filed: Jun. 20, 2018

(65) Prior Publication Data

US 2018/0298146 A1 Oct. 18, 2018

Related U.S. Application Data

(63) Continuation-in-part of application No. 15/389,711, filed on Dec. 23, 2016, now abandoned.

(60) Provisional application No. 62/277,091, filed on Jan. 11, 2016.

(30) Foreign Application Priority Data

Dec. 21, 2016 (TW) .............................. 105142423 A

(51) Int. Cl.
*C08G 75/14* (2006.01)

(52) U.S. Cl.
CPC .................................. *C08G 75/14* (2013.01)

(58) Field of Classification Search
CPC .... C07F 7/0801; C07F 7/0832; C07F 7/0827; C08G 75/00; C07B 51/00; C07D 209/12
See application file for complete search history.

(56) References Cited

U.S. PATENT DOCUMENTS

| | | | |
|---|---|---|---|
| 2,739,991 | A | 3/1956 | Hervert |
| 2,843,643 | A | 7/1958 | Gleim |
| 3,354,129 | A | 11/1967 | Edmonds, Jr. et al. |
| 3,987,016 | A | 10/1976 | Haddad et al. |
| 4,124,646 | A | 11/1978 | Kawamura et al. |
| 4,786,713 | A | 11/1988 | Rule et al. |
| 5,618,981 | A | 4/1997 | Shaw |
| 6,111,143 | A | 8/2000 | Park et al. |
| 6,215,021 | B1 | 4/2001 | Shreeve et al. |
| 8,445,629 | B2 | 5/2013 | Hinokimori et al. |
| 8,492,502 | B2 | 7/2013 | Lee et al. |
| 8,759,478 | B2 | 6/2014 | Shin et al. |
| 8,957,182 | B2 | 2/2015 | Lee et al. |

| | | | |
|---|---|---|---|
| 2004/0013926 | A1 | 1/2004 | Akita et al. |
| 2014/0128568 | A1 | 5/2014 | Hinokimori |
| 2016/0200874 | A1 | 7/2016 | Watanabe et al. |

FOREIGN PATENT DOCUMENTS

| | | |
|---|---|---|
| CN | 1209349 C | 7/2005 |
| CN | 101578321 A | 11/2009 |
| CN | 100567371 C | 12/2009 |
| EP | 3034542 A1 | 6/2016 |
| EP | 3042924 A1 | 7/2016 |
| JP | 50-29511 A | 3/1975 |
| JP | 1-78993 U | 5/1989 |
| JP | 5-178993 A | 7/1993 |
| JP | 5-239213 A | 9/1993 |
| JP | 7-278099 A | 10/1995 |
| JP | 7-304872 A | 11/1995 |
| JP | 9-48854 A | 2/1997 |
| JP | 10-182823 A | 7/1998 |
| JP | 10-182825 A | 7/1998 |
| JP | 2988827 B2 | 12/1999 |
| JP | 2992517 B1 | 12/1999 |

(Continued)

OTHER PUBLICATIONS

Ding et al., "Preparation of Poly(thioarylene)s from Cyclic Disulfide Oligomers", vol. 30, No. 9, May 5, 1997, 5 pages.

(Continued)

*Primary Examiner* — Shane Fang

(74) *Attorney, Agent, or Firm* — Birch, Stewart, Kolasch & Birch, LLP

(57) ABSTRACT

A method for preparing a polymer is provided. The method for preparing a polymer includes subjecting at least one monomer having a structure represented by Formula (I) to a reaction in the presence of sulfonic acid, diphenyl amine, and oxygen-containing phosphide, obtaining a sulfonium salt polymer Formula (I)

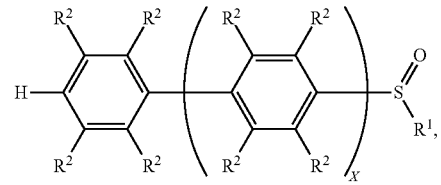

wherein x is 0, 1, or 2; $R^1$ is $C_{1-6}$ alkyl group; and $R^2$ is independently hydrogen, or $C_{1-6}$ alkyl group. In particular, the molar ratio of the diphenyl amine to the oxygen-containing phosphide is from 4:1 to 1:1.

15 Claims, No Drawings

(56) References Cited

FOREIGN PATENT DOCUMENTS

| | | |
|---|---|---|
| JP | 2005-330185 A | 12/2005 |
| JP | 2010-59159 A | 3/2010 |
| JP | 2013-523756 A | 6/2013 |
| JP | 2015-48447 A | 3/2015 |
| JP | 2015-048448 A | 3/2015 |
| KR | 10-2007-0036776 A | 4/2007 |
| TW | 69880 A | 9/1985 |
| TW | 167606 | 9/1991 |
| TW | I242567 B | 11/2005 |
| TW | I421281 B | 1/2014 |
| TW | 201512249 A | 4/2015 |
| TW | 201512306 A | 4/2015 |
| WO | WO 95/23148 A1 | 8/1995 |
| WO | WO 2014/084331 A1 | 6/2014 |
| WO | WO 2015/033936 A1 | 3/2015 |
| WO | WO 2015/033938 A1 | 3/2015 |

OTHER PUBLICATIONS

Japanese Office Action dated Jul. 3, 2018 for Application No. 2017-002112 with an English translation.
European Search Report for Appl. No. 17150788.2 dated Apr. 21, 2017.
Extended European Search Report issued in European Application No. 17150823.7, dated Apr. 18, 2017.
Extended European Search Report issued in European Application No. 17150883.1, dated Apr. 10, 2017.
Extended European Search Report, dated Mar. 28, 2017, for European Application No. 17150910.2.
Gabler et al., "Neue Polyphenylensulfone Reaktionen an Festen Polymeren," Chimia International Journal for Chemistry, vol. 28, No. 9, Sep. 1974, pp. 567-574, with an English abstract.
Goethals et al., "Réactions du Sulfoxyde De Diméthyle", Bull. Soc. Chim. Belg., vol. 73, 1964, pp. 546-559.
Hartke et al., "Reaction of Thioanisol with Antimony Pentachloride," Arch. Pharm., vol. 315, No. 2, 1982, pp. 153-156, with an English abstract.
Haryono, A., et al, "Synthesis and Nucleophilic Dealkylation of Poly[alkyl-(4-(phenylthio)phenyl)sulfonium trifluoromethanesulfonate]s," Macromolecules, 1998, vol. 31, pp. 1202-1207.
Ho, et al., U.S. Appl. No. 15/381,684, filed Dec. 16, 2016.
Ho, et al., U.S. Appl. No. 15/388,215, filed Dec. 22, 2016.
Ho, et al., U.S. Appl. No. 15/389,785, filed Dec. 23, 2016.
Ho, et al., U.S. Appl. No. 15/393,913, filed Dec. 29, 2016.
Japanese Notice of Reasons for Rejection for Japanese Application No. 2017-001902, dated Nov. 7, 2017, with an English translation.
Jílek et al., "Potential metabolites of the neuroleptic agents belonging to the 8-methylthio-10-piperazino-10,11-dihydrodibenzo[b,f]thiepin series; Synthesis of 2-hydroxy and 3-hydroxy derivatives," Collect. Czech. Chem. Commun., vol. 50, No. 10, 1985, pp. 2179-2190.
Miyatake, K., et al, "Polymerization of Methyl Phenyl Sulfoxide under Acidic Conditions: Synthesis and X-ray Structure Analysis of a Phenylene Sulfonium Polymer," Macromolecules, 2001, vol. 34, pp. 1172-1179.
Miyatake, K., et al, "Synthesis and Proton Conductivity of Highly Sulfonated Poly(thiophenylene)," Macromolecules, 1997, vol. 30, pp. 2941-2946.
Office Action issued in Chinese Patent Application No. 201710013837.3, dated Apr. 16, 2018.
Office Action issued in Chinese Patent Application No. 201710017862.9, dated May 28, 2018.
Office Action issued in Japanese Patent Application No. 2017-002111, dated Feb. 27, 2018.
Office Action issued in Japanese Patent Application No. 2017-002113, dated Mar. 13, 2018.
Ogawa et al., "Development of New Synthetic Procedure of Poly(phenylene sulfide)," Abstracts of the 37th Symposium on Main Group Element Chemistry, vol. 37, 2010, pp. 301-302, with an English abstract.
Schultz et al., "New Catalysts for the Oxidation of Sulfides to Sulfones with Hydrogen Peroxide", The Journal of Organic Chemistry, vol. 28, No. 4, Apr. 1963, pp. 1140-1142.
Taiwanese Office Action and Search Report dated Jul. 3, 2017 for Application No. 105143831.
Taiwanese Office Action and Search Report for Taiwanese Application No. 105142423, dated Apr. 13, 2017.
Taiwanese Office Action and Search Report issued in Taiwanese Application No. 105142207 dated Dec. 19, 2017.
Taiwanese Office Action and Search Report issued in Taiwanese Application No. 105143834 dated Sep. 6, 2017.
Tsuchida et al., "Photochemical recycling of polyarylene sulfide," Chemical Communications, No. 17, Sep. 7, 1996, pp. 2091-2092.
Tsuchida et al., "Synthesis of high molecular weight poly(phenylene sulfide) by oxidative polymerization via poly(sulfonium cation) from methyl phenyl sulfoxide," Macromolecules, vol. 26, No. 26, Dec. 20, 1993 (abstract published Nov. 15. 1993), pp. 7144-7148.
Tsuchida et al., "Synthesis of Poly(phenylene sulfide) by $O_2$ Oxidative Polymerization of Methyl Phenyl Sulfide," Macromolecules, vol. 27, No. 4, Feb. 14, 1994 pp. 1057-1060.
Tsuchida, E., et al, "First Phenylene Polymers Linked by Sulfonium Groups," Angew. Chem. Int. Engl., 1996, vol. 35, No. 23/24, pp. 2843-2845.
U.S. Office Action for U.S. Appl. No. 15/389,785 dated Sep. 29, 2017.
U.S. Office Action for U.S. Appl. No. 15/393,913, dated Dec. 8, 2017.
Ukai et al., "Die Reaktion der Phenolderivate mit Sulfoxiden. IV (einschließlich der von Sulfiden und Wasserstoffperoxid ausgehenden Reaktion). Die Synthese von 4-Thiosubstituierten-1, 2-Naphthochinonderivaten," Chem. Pharm. Bull., vol. 16, No. 4, 1968, pp. 606-612 (8 pages total), with an English abstract.
Yamamoto et al., "Aryl sulfide bond formation using the sulfoxide-acid system for synthesis of PPS via poly(sulfonium cation) as a precursor," Journal of The American Chemical Society, vol. 115, No. 13, Jun. 1993, pp. 5819-5820.
Yamamoto et al., "Oxidative Coupling of Methyl Phenyl Sulfide via Sulfonium Formation Using an Oxovanadium Complex," The Journal of Organic Chemistry, vol. 61, No. 6, Mar. 22, 1996, pp. 1912-1913.
Yamamoto et al., "Synthesis of poly(sulfonium cation) by oxidative polymerization of aryl alkyl sulfides," The Journal of Organic Chemistry, vol. 60, No. 2, 1995, pp. 452-453.
Yamamoto, K., et al, "Sulfide Bond Formation for the Synthesis of Poly(thioarylene) through Oxidation of Sulfur Chloride with Aromatics," Macromolecules, 1994, vol. 27, pp. 4312-4317.

METHOD FOR PREPARING A POLYMER

CROSS REFERENCE TO RELATED APPLICATIONS

This application is a Continuation-In-Part of pending U.S. patent application Ser. No. 15/389,711, filed Dec. 23, 2016 and entitled "method for preparing polymer", the entirety of which is incorporated by reference herein, which claims the benefit of U.S. Provisional Application No. 62/277,091, filed on Jan. 11, 2016 and is based on, and claims priority from, Taiwan Application Serial Number 105142423, filed on Dec. 21, 2016.

TECHNICAL FIELD

The disclosure relates to a method for preparing a polymer, and in particular to a method for preparing a sulfonium salt polymer or polyarylene sulfide (PAS).

BACKGROUND

Polyarylene sulfide (PAS) is a material with good physical characteristics such as thermal resistance, chemical resistance, flame resistance, and electrical insulation characteristics. Thus, polyarylene sulfide (PAS) can be used in computer accessories and auto accessories; as industrial fibers having chemical resistance; and as a coating for parts that come into contact with corrosive chemicals.

One conventional method for producing polyarylene sulfide (PAS) is the halogen-containing process that, in principle, results in a low yield of polyarylene sulfide (PAS) and produces unrecyclable halogen-containing byproducts that can cause environmental pollution. Since the purification of polyarylene sulfide (PAS) using a conventional method is very difficult, the halogen-containing byproducts reside in the polyarylene sulfide (PAS).

Therefore, a novel method for preparing polyarylene sulfide (PAS) is needed.

SUMMARY

According to embodiments of the disclosure, the disclosure provides a method for preparing a polymer. The method includes subjecting at least one monomer having a structure represented by Formula (I) to a reaction in the presence of sulfonic acid, diphenyl amine, and oxygen-containing phosphide, obtaining a sulfonium salt polymer Formula (I)

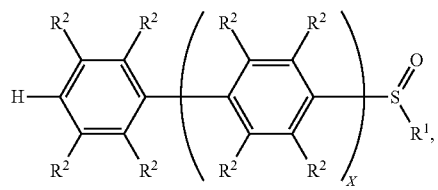

wherein x is 0, 1, or 2; $R^1$ is $C_{1-6}$ alkyl; and $R^2$ is independently hydrogen, or $C_{1-6}$ alkyl. In particular, the molar ratio of the diphenyl amine to the oxygen-containing phosphide is from about 4:1 to 1:1.

A detailed description is given in the following embodiments with reference to the accompanying drawings.

DETAILED DESCRIPTION

The conversion rate of the polyarylene sulfide (PAS) is not high when the polyarylene sulfide (PAS) is prepared by polymerizing the monomer (I) (such as

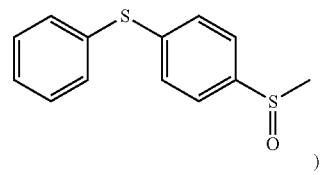 [SMILES: CS(=O)c1ccc(Sc2ccccc2)cc1]

)

under acidic conditions to form the cationic polymer and then subjecting the cationic polymer to a demethylation, referring to Reaction Formula (I).

Reaction Formula (I)

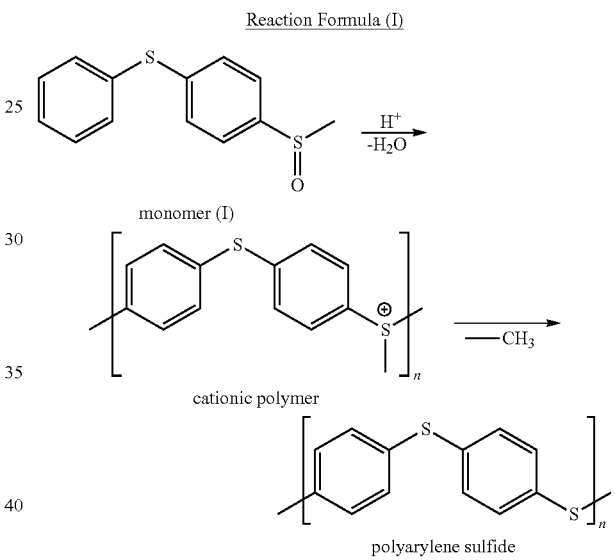

In addition, the monomer (I) may be prepared according to Reaction Formula (II), i.e. a methyl phenyl sulfoxide is reacted with methyl phenyl sulfide under acidic conditions to obtain a cationic intermediate and the cationic intermediate is subjected to a demethylation and oxidation. The yield of the monomer (I), however, is reduced due to the complexity of the preparation as shown in Reaction Formula (II).

Reaction Formula (II)

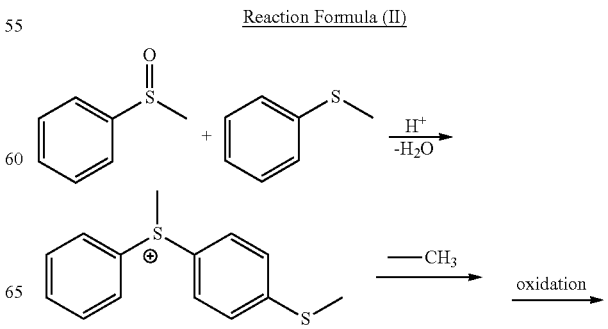

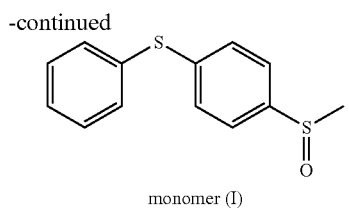

monomer (I)

Accordingly, the embodiments of the disclosure provide a method for preparing a polymer in order to increase the availability of the monomer and improve the conversion rate of the monomer to sulfonium salt polymer. According to embodiments of the disclosure, the method includes subjecting at least one monomer having a structure represented by Formula (I) to a polymerization in the presence of sulfonic acid, diphenyl amine, and oxygen-containing phosphide, obtaining a sulfonium salt polymer.

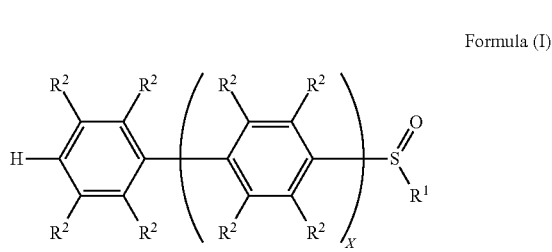

Formula (I)

In particular, x can be 0, 1, or 2; $R^1$ can be $C_{1-6}$ alkyl; and $R^2$ can be independently hydrogen, or $C_{1-6}$ alkyl. According to embodiments of the disclosure, the sulfoxide functional group (S=O) of the monomer having a structure represented by Formula (I) can be protonated under acidic conditions to form a reactive sulfonium hydroxide. Furthermore, the diphenyl amine, serving as charge control agent, can provide an electron to complex with the sulfonium hydroxide to form a complex structure, thereby enhancing the reactivity of the π-electrons of the aromatic ring for polymerization. The conversion rate of the monomer having a structure represented by Formula (I) to the sulfonium salt polymer (or polyarylene sulfide) can be significantly increased when the polymerization is performed in the presence of the oxygen-containing phosphide. According to embodiments of the disclosure, when the molar ratio of the diphenyl amine to the oxygen-containing phosphide is from about 4:1 to 1:1, the conversion rate of the monomer having a structure represented by Formula (I) to the sulfonium salt polymer (or polyarylene sulfide) can be greater than or equal to 80%. In addition, after obtaining the sulfonium salt polymer, a nucleophile can be reacted with the sulfonium salt polymer, obtaining a thermal resistant polyarylene sulfide (having a melting temperature (Tm) higher than or equal to 280° C.) without being mixed with halogen-containing byproduct. According to embodiments of the disclosure, the conversion rate of the monomer having a structure represented by Formula (I) to the sulfonium salt polymer (or polyarylene sulfide) was determined by the following equation:

$$\text{conversion rate} = \frac{\text{weight of sulfonium salt polymer (or polyarylene sulfide)}}{\text{weight of monomer}} \times 100\%$$

According to embodiments of the disclosure, the alkyl group of the disclosure can be a linear or branched alkyl group. Therefore, $R^1$ can be methyl, ethyl, propyl, isopropyl, n-butyl, t-butyl, sec-butyl, isobutyl, pentyl, or hexyl. In addition, each $R^2$ can be independently hydrogen, fluorine, methyl, ethyl, propyl, isopropyl, n-butyl, t-butyl, sec-butyl, isobutyl, pentyl, or hexyl.

According to embodiments of the disclosure, the method for preparing a polymer of the disclosure includes subjecting at least one monomer having a structure represented by Formula (I) to a polymerization in the presence of sulfonic acid, diphenyl amine, and oxygen-containing phosphide, obtaining a sulfonium salt polymer. In some embodiments of the disclosure, the at least one monomer includes two or more than two monomers which have a structure represented by Formula (I). According to embodiments of the disclosure, when one of the at least one monomer having a structure represented by Formula (I) is

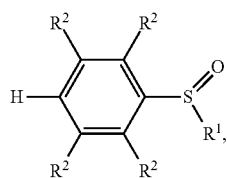

the at least one monomer having a structure represented by Formula (I) can further include

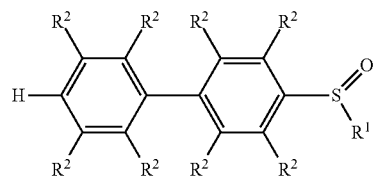

and/or

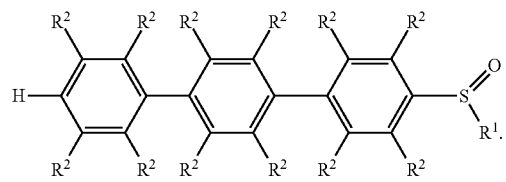

According to embodiments of the disclosure, the sulfonic acid can be a compound having a structure represented by Formula (II)

$$R^3-\overset{\overset{O}{\|}}{\underset{\underset{O}{\|}}{S}}-OH,$$

Formula (II)

wherein $R^3$ can be hydrogen, $C_{1-6}$ alkyl group, or $C_{1-6}$ fluoroalkyl group. Herein, the fluoroalkyl group means that hydrogen atoms bonded on carbon atoms of linear or branched alkyl group can be partially or totally replaced with fluorine. For Example, fluoromethyl can be —$CH_2F$, —CHF$_2$— or —CF$_3$. According to embodiments of the disclosure, R$^3$ can be methyl, ethyl, propyl, isopropyl, n-butyl, t-butyl, sec-butyl, isobutyl, pentyl, hexyl, fluoromethyl, fluoroethyl, or fluoropropyl. According to some embodiments of the disclosure, the sulfonic acid can be methanesulfonic acid, ethanesulfonic acid, propylsulfonic acid, trifluoromethanesulfonic acid (CF$_3$SO$_3$H), or a combination thereof. According to embodiments of the disclosure, the molar ratio of the sulfonic acid to the monomer can be from about 1 to 200, such as from about 1 to 100. Herein, the sulfonic acid can provide acidic conditions in order to promote the polymerization of the monomer, and the excessive sulfonic acid can also serve as the reaction solvent.

According to embodiments of the disclosure, due to the oxygen-containing phosphide used in the method for preparing a polymer of the disclosure, the conversion rate of the monomer having a structure represented by Formula (I) to the sulfonium salt polymer can be significantly increased. The oxygen-containing phosphide can be a compound consisting of oxygen and phosphorus, such as phosphoric anhydride (P$_2$O$_5$). In addition, the oxygen-containing phosphide can be a compound consisting of oxygen, hydrogen and phosphorus, such as polyphosphoric acid (H$_{(n+2)}$P$_n$O$_{(3n+1)}$, wherein n is larger than 1). According to embodiments of the disclosure, the molar ratio of the oxygen-containing phosphide to the monomer can be from about 0.5 to 2, such as from about 0.5 to 1.5.

According to embodiments of the disclosure, the molar ratio of the diphenyl amine to the monomer can be from about 0.5 to 2, such as from about 0.5 to 1.5. The diphenyl amine and oxygen-containing phosphide can enhance the polymerization of the monomer having a structure represented by Formula (I), and the diphenyl amine and oxygen-containing phosphide are not reactants of the polymerization.

According to embodiments of the disclosure, the method for preparing a polymer of the disclosure can include subjecting one monomer having a structure represented by Formula (I) to a polymerization in the presence of sulfonic acid, diphenyl amine, and oxygen-containing phosphide, wherein the monomer having a structure represented by Formula (I) can be

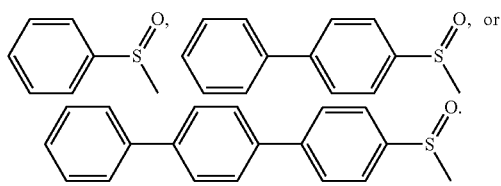

In addition, according to embodiments of the disclosure, the method for preparing a polymer of the disclosure can include subjecting two different monomers having a structure represented by Formula (I) to a polymerization in the presence of sulfonic acid, diphenyl amine, and oxygen-containing phosphide, wherein one of the two different monomers can be

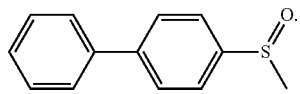

For example, the two different monomers having a structure represented by Formula (I) can be diphenyl amine

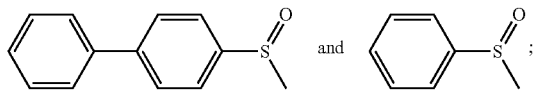

the two different monomers having a structure represented by Formula (I) can be

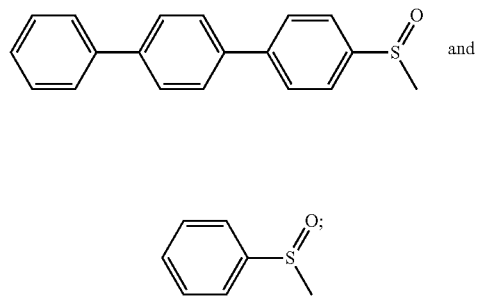

and the two different monomers having a structure represented by Formula (I) can be

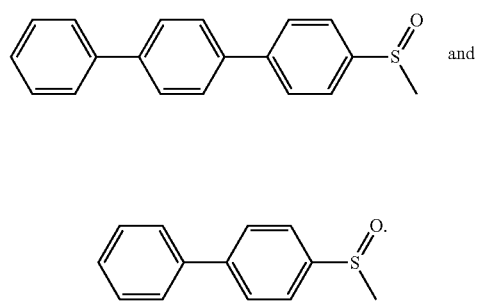

Furthermore, according to embodiments of the disclosure, the method for preparing a polymer of the disclosure can include subjecting three different monomers having a structure represented by Formula (I) to a polymerization in the presence of sulfonic acid, diphenyl amine, and oxygen-containing phosphide. For example, the three different monomers having a structure represented by Formula (I) can be

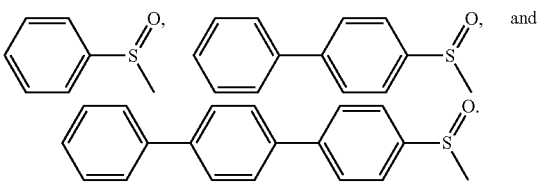

According to embodiments of the disclosure, the sulfonium salt polymer prepared by the aforementioned method for preparing a polymer of the disclosure can include at least one repeating unit having a structure represented by Formula (III), Formula (III)

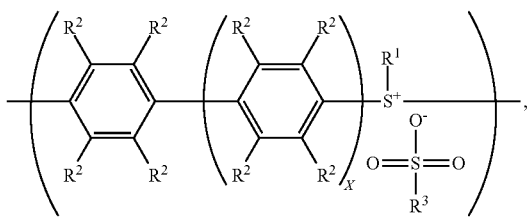

wherein x can be 0, 1, or 2; $R^1$ can be $C_{1-6}$ alkyl group; each $R^2$ can be independently hydrogen, or $C_{1-6}$ alkyl group; and, $R^3$ can be hydrogen, $C_{1-6}$ alkyl group, or $C_{1-6}$ haloalkyl group. According to some embodiments of the disclosure, the repeating unit having a structure represented by Formula (III) can be

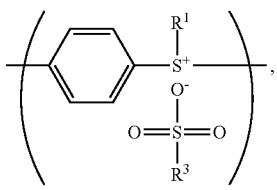

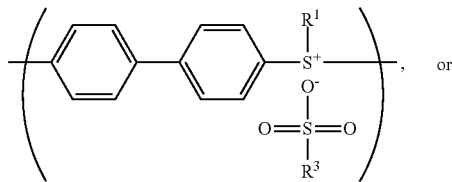, or

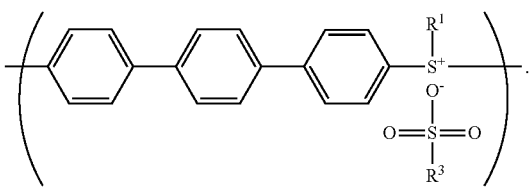

According to embodiments of the disclosure, after obtaining the sulfonium salt polymer, the method for preparing a polymer can further include reacting a nucleophile with the sulfonium salt polymer, obtaining a polyarylene sulfide. In particular, the nucleophile can be substituted or unsubstituted pyridine or derivatives thereof (such as pyridine or 4-methylpyridine), amine (such as triethylamine), halogenated salt (such as potassium chloride), alcohol (such as methanol or ethanol), or amide (such as dimethylformamide, dimethylacetamide, or N-methylpyrrolidone). The molar ratio of the nucleophile to the monomer having a structure represented by Formula (I) (for forming the sulfonium salt polymer) can be from about 1 to 100, and the excessive nucleophile can also serve as the reaction solvent. The polyarylene sulfide (PAS) can have at least one repeating unit having a structure represented by Formula (IV)

Formula (IV)

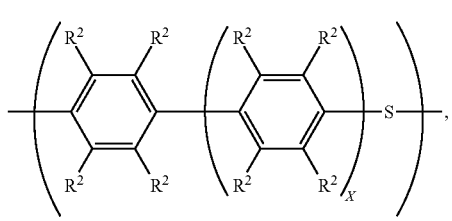

wherein x can be 0, 1, or 2; and, each $R^2$ can be hydrogen, or $C_{1-6}$ alkyl group. The repeating unit having a structure represented by Formula (IV) can be

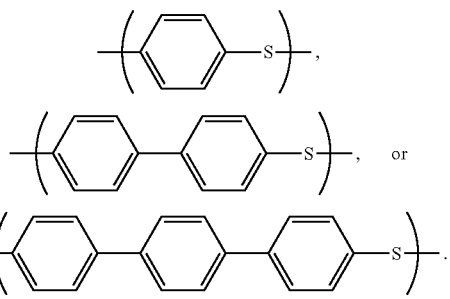

The inventive concept of the disclosure may be embodied in various forms without being limited to the exemplary embodiments set forth herein.

EXAMPLE 1

0.5 g of methyl phenyl sulfoxide, 0.25 g of phosphorus pentoxide ($P_2O_5$), and 0.3 g of diphenyl amine were added into a reaction bottle, wherein the molar ratio of the diphenyl amine to the phosphorus pentoxide was about 2:1. Next, 3 ml of trifluoromethanesulfonic acid was added slowly into the reaction bottle at 0° C. (ice bath). After stirring for 1 hr, the reaction bottle was raised back to room temperature. After stirring for 20 hr, the result was poured into 100 ml of ethyl ether. After stirring, the result was washed with a small amount of acetone. After drying, Sulfonium salt polymer (I) (white solid) was obtained.

Next, Sulfonium salt polymer (I) was dissolved in 15 ml of 4-methylpyridine, and the obtained solution was heated to reflux (about 100° C.). After stirring for 6 hr, the result was poured into 30 ml of hydrochloric acid aqueous solution (with a concentration of 10%), and then washed with a small amount of acetone, obtaining Polyarylene sulfide (PAS) (I) (white solid) with a conversion rate about 88%. The synthesis pathway of the above reaction was as follows:

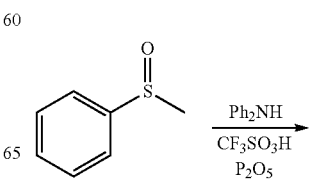

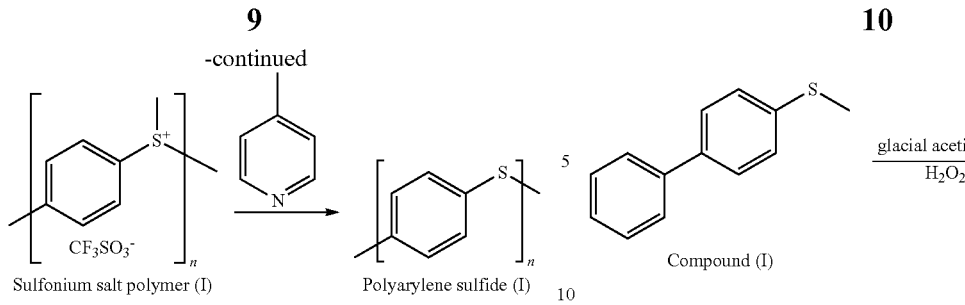

Sulfonium salt polymer (I) → Polyarylene sulfide (I)

Next, the properties of Polyarylene sulfide (PAS) (I) were measured by a differential scanning calorimetry (DSC), and the result shows that Polyarylene sulfide (PAS) (I) has a melting temperature (Tm) of about 281° C. and a recrystallization temperature (Tc) of about 210° C. Next, Polyarylene sulfide (PAS) (I) was analyzed by Fourier-transform infrared (FT-IR) spectroscopy, and the result shows that the strong absorption peaks (cm$^{-1}$) are 3065, 1573, 1471, 1387, 1092, 1009, 998, 815, 742.

EXAMPLE 2

3 g of phenylboronic acid, 3.45 g of 4-bromothioanisole, 0.1 g of Pd(PPh$_3$)$_4$, and 1.5 g of sodium carbonate (Na$_2$CO$_3$) were added into a reaction bottle. Next, 50 ml of toluene, 60 ml of deionized water, and 10 ml of methanol were added slowly into the reaction bottle. After stirring for 24 hr at 100° C., ethyl acetate was utilized to extract the solution with water several times, and then the organic phase was collected. After drying, Compound (I) (1-methylsulfanyl-4-phenylbenzene) with a yield of about 99% was obtained. The synthesis pathway of the above reaction was as follows:

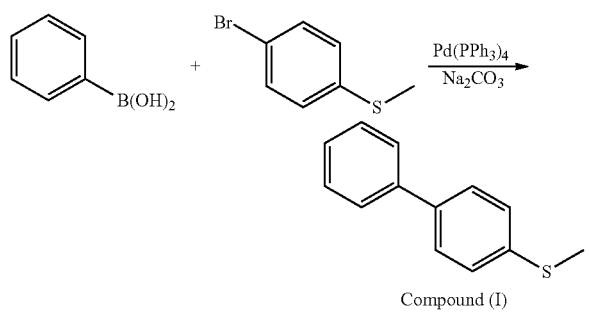

Compound (I)

Compound (I) was analyzed by nuclear magnetic resonance (NMR) spectroscopy and the result is as follows: $^1$H NMR (500 MHz, ppm, CDCl$_3$): 2.55 (—CH3, s), 7.33-7.37 (phenyl, 3H, m), 7.43-7.45 (phenyl, 2H, m), 7.54-7.6 (phenyl, 4H, m).

Next, 1 g of compound (I) was added into a reaction bottle, and then 10 ml of acetic acid and 2 ml of hydrogen peroxide (with a concentration of 30%) were added slowly into the reaction bottle. After stirring at room temperature for 20 min, the result was filtered, obtaining an orange solid. The orange solid was extracted three times using dichloromethane and water as the extraction solvent, and then the organic phase was collected. After drying, filtering and concentrating the organic phase, Compound (II) was obtained. The synthesis pathway of the above reaction was as follows:

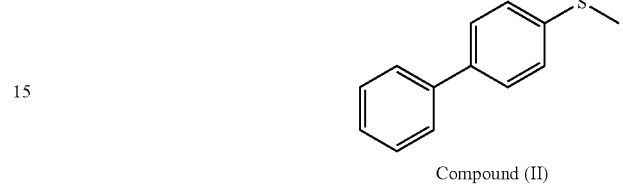

Compound (I)

Compound (II)

Compound (II) was analyzed by nuclear magnetic resonance (NMR) spectroscopy and the result is as follows: $^1$H NMR (500 MHz, ppm, CDCl$_3$): 2.80 (—CH$_3$, s), 7.42-7.51 (biphenyl, 3H, m), 7.62-7.63 (biphenyl, 2H, m), 7.73-7.78 (biphenyl, 4H, m).

Next, 0.5 g of compound (II), 0.39 g of diphenyl amine, and 0.0.9 g of phosphorus pentoxide (P$_2$O$_5$) were added into a reaction bottle, wherein the molar ratio of the diphenyl amine to the phosphorus pentoxide was 8:1. Next, 5 ml of trifluoromethanesulfonic acid was added into the reaction bottle at 0° C. (ice bath). After stirring at 0° C. (ice bath) for 1 hr, the reaction bottle was raised slowly back to room temperature. After stirring for 20 hr, the result was poured into 100 ml of ethyl ether, and then washed with a small amount of acetone. After drying, Sulfonium salt polymer (II) was obtained. Next, Sulfonium salt polymer (II) was dissolved in 6 ml of 4-methylpyridine, and then stirred at room temperature for 1 hr. Next, the result was heated to reflux (about 120° C.). After stirring for 20 hr, the result was poured into 30 ml of hydrochloric acid aqueous solution (with a concentration of 10%), and then washed with a small amount of acetone, obtaining Polyarylene sulfide (PAS) (II) (white solid) with a conversion rate of about 64%, as shown in Table 1. The synthesis pathway of the above reaction was as follows:

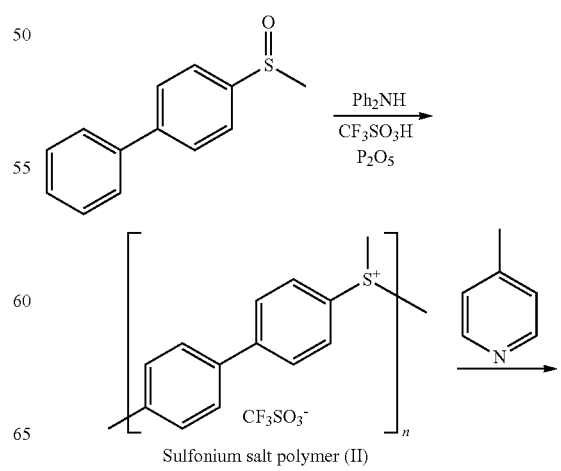

Sulfonium salt polymer (II)

Polyarylene sulfide (II) (n > 1)

Next, the properties of Polyarylene sulfide (PAS) (II) were measured by a differential scanning calorimetry (DSC), and the result shows that Polyarylene sulfide (PAS) (II) has a melting temperature (Tm) of about 404° C. and a recrystallization temperature (Tc) of about 369° C. Next, Polyarylene sulfide (PAS) (II) was analyzed by Fourier-transform infrared (FT-IR) spectroscopy, and the result shows that the strong absorption peaks ($cm^{-1}$) are 3026, 1590, 1474, 1391, 1313, 1152, 1137, 1090, 1045, 998, 952, 811, 758, 690.

EXAMPLE 3

Example 3 was performed in the same manner as in Example 2 except that the molar ratio of the diphenyl amine to the phosphorus pentoxide was varied from 8:1 to 4:1, obtaining Polyarylene sulfide (PAS) (II) with a conversion rate about 83%, as shown in Table 1.

EXAMPLE 4

Example 4 was performed in the same manner as in Example 2 except that the molar ratio of the diphenyl amine to the phosphorus pentoxide was varied from 8:1 to 2:1, obtaining Polyarylene sulfide (PAS) (II) with a conversion rate about 90%, as shown in Table 1.

EXAMPLE 5

Example 5 was performed in the same manner as in Example 2 except that the molar ratio of the diphenyl amine to the phosphorus pentoxide was varied from 8:1 to 1:1, obtaining Polyarylene sulfide (PAS) (II) with a conversion rate about 89%, as shown in Table 1.

Comparative Example 1

0.5 g of compound (II) and 0.39 g of diphenyl amine were added into a reaction bottle. Next, 5 ml of trifluoromethanesulfonic acid was added into the reaction bottle and cooled to 0° C. (ice bath). After stirring at 0° C. (ice bath) for 1 hr, the reaction bottle was raised slowly back to room temperature. Next, after stirring for 20 hr, the result was poured into 100 ml of ethyl ether, and washed with a small amount of acetone. After drying, Sulfonium salt polymer (II) was obtained. Next, Sulfonium salt polymer (II) was dissolved in 6 ml of 4-methylpyridine and stirred at room temperature for 1 hr. Next, the result was heated to reflux (about 120° C.). After stirring for 20 hr, the result was poured into 30 ml of hydrochloric acid aqueous solution (with a concentration of 10%), and washed with a small amount of acetone, obtaining Polyarylene sulfide (PAS) (II) (white solid) with a conversion rate of about 57%, as shown in Table 1. The synthesis pathway of the above reaction was as follows:

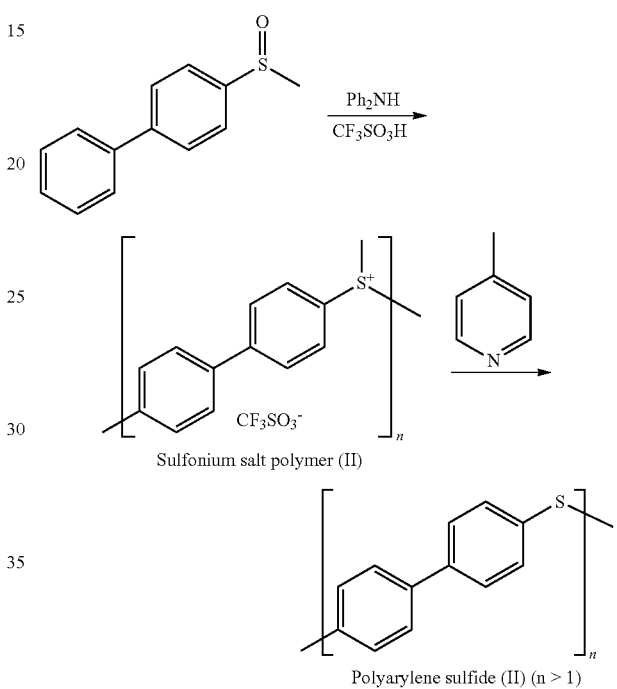

TABLE 1

|  | compound (II) | trifluoromethanesulfonic acid | diphenyl amine | phosphorus pentoxide | molar ratio of the diphenyl amine to the phosphorus pentoxide | conversion rate |
| --- | --- | --- | --- | --- | --- | --- |
| Example 2 | 0.5 g | 5 ml | 0.39 g | 0.09 g | ~8:1 | 64% |
| Example 3 | 0.5 g | 5 ml | 0.39 g | 1.17 g | ~4:1 | 83% |
| Example 4 | 0.5 g | 5 ml | 0.39 g | 0.33 g | ~2:1 | 90% |
| Example 5 | 0.5 g | 5 ml | 0.39 g | 0.65 g | ~1:1 | 89% |
| Comparative Example 1 | 0.5 g | 5 ml | 0.39 g | — | — | 57% |

In comparison with Comparative Example 1, besides trifluoromethanesulfonic acid and diphenyl amine, Examples 2-5 further employed phosphorus pentoxide during the polymerization of Compound (II). As shown in Table 1, in comparison with Comparative Example 1, Polyarylene sulfide (PAS) (II) prepared by Examples 2-5 exhibits a relatively high conversion rate. Furthermore, when the molar ratio of the diphenyl amine to the phosphorus pentoxide is within a range from 4:1 to 1:1 (Examples 3-5), the Polyarylene sulfide (PAS) (II) conversion rate (of the methods disclosed in Examples 3-5) can be increased from 64% to more than 80%, in comparison with the method disclosed in Example 2 (wherein the molar ratio of the diphenyl amine to the phosphorus pentoxide is about 8:1).

Example 6

0.19 g of methyl phenyl sulfoxide, 0.3 g of compound (II), 0.1 g of phosphorus pentoxide, and 0.23 g of diphenyl amine were added into a reaction bottle, wherein the molar ratio of the diphenyl amine to the phosphorus pentoxide was 8:1. Next, 3 ml of trifluoromethanesulfonic acid was added at 0° C. (ice bath). After stirring at 0° C. (ice bath) for 1 hr, the reaction bottle was raised slowly back to room temperature. After stirring for 20 hr, the result was poured into 100 ml of ethyl ether, and then washed with a small amount of acetone. After drying, Sulfonium salt polymer (III) was obtained. Next, Sulfonium salt polymer (III) was dissolved in 15 ml of 4-methylpyridine, and then stirred at room temperature for 1 hr. Next, the result was heated to reflux (about 100° C.). After stirring for 6 hr, the result was poured into 30 ml of hydrochloric acid aqueous solution (with a concentration of 10%), and then washed with a small amount of acetone, obtaining Polyarylene sulfide (PAS) (III) (white solid) with a conversion rate of about 69%, as shown in Table 2. The synthesis pathway of the above reaction was as follows:

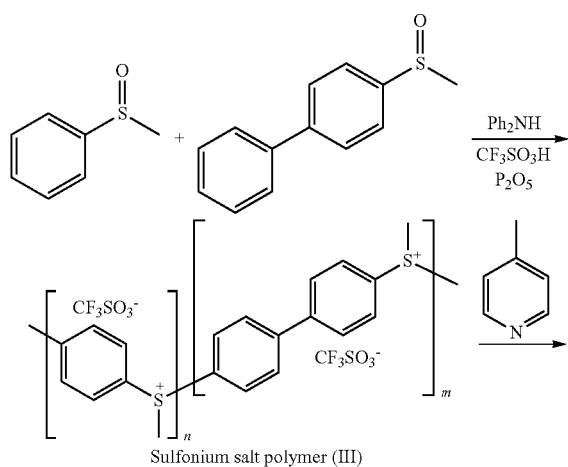

Sulfonium salt polymer (III)

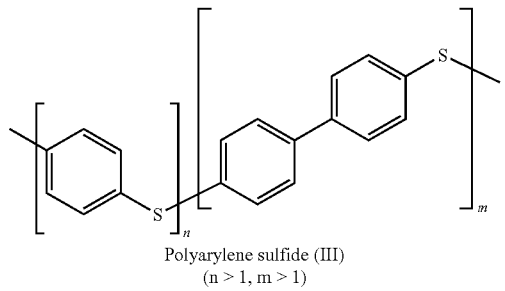

Polyarylene sulfide (III)
(n > 1, m > 1)

(the repeating units of the Sulfonium salt polymer (III) or Polyarylene sulfide (PAS) (III) are arranged in a random fashion)

Next, the properties of Polyarylene sulfide (PAS) (III) were measured by a differential scanning calorimetry (DSC), and the result shows that Polyarylene sulfide (PAS) (III) has a glass transition temperature (Tg) of about 113° C. Next, Polyarylene sulfide (PAS) (III) was analyzed by Fourier-transform infrared (FT-IR) spectroscopy, and the result shows that the strong absorption peaks are 3024, 1584, 1474, 1389, 1319, 1178, 1155, 1090, 1001, 810, 759, 694.

EXAMPLE 7

Example 7 was performed in the same manner as in Example 6 except that the molar ratio of the diphenyl amine to the phosphorus pentoxide was varied from 8:1 to 2:1, obtaining Polyarylene sulfide (PAS) (III) (white solid) with a conversion rate about 89%, as shown in Table 2.

EXAMPLE 8

Example 8 was performed in the same manner as in Example 6 except that the molar ratio of the diphenyl amine to the phosphorus pentoxide was varied from 8:1 to 1:1, obtaining Polyarylene sulfide (PAS) (III) (white solid) with a conversion rate about 91%, as shown in Table 2.

Comparative Example 2

0.19 g of methyl phenyl sulfoxide, 0.3 g of compound (II), and 0.23 g of diphenyl amine were added into a reaction bottle. Next, 3 ml of trifluoromethanesulfonic acid was added at 0° C. (ice bath). After stirring at 0° C. (ice bath) for 1 hr, the reaction bottle was raised slowly back to room temperature. After stirring for 20 hr, the result was poured into 100 ml of ethyl ether, and then washed with a small amount of acetone. After drying, Sulfonium salt polymer (III) was obtained. Next, Sulfonium salt polymer (III) was dissolved in 15 ml of 4-methylpyridine, and then stirred at room temperature for 1 hr. Next, the result was heated to reflux (about 100° C.). After stirring for 6 hr, the result was poured into 30 ml of hydrochloric acid aqueous solution (with a concentration of 10%), and then washed with a small amount of acetone, obtaining Polyarylene sulfide (PAS) (III) (white solid) with a conversion rate less than about 5%, as shown in Table 2. The synthesis pathway of the above reaction was as follows:

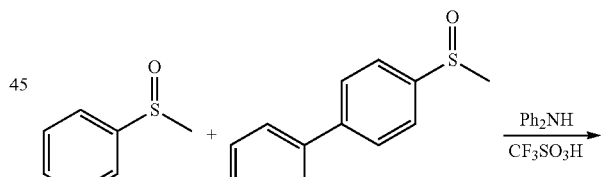

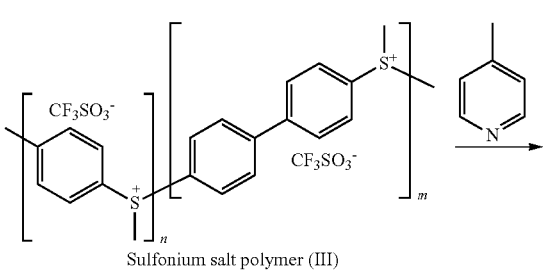

Sulfonium salt polymer (III)

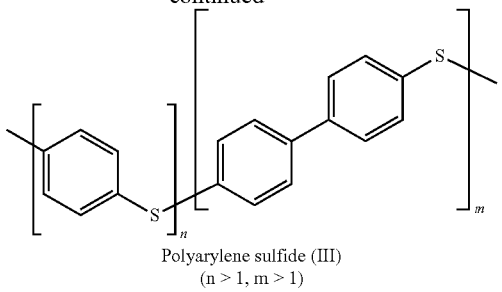

Polyarylene sulfide (III)
(n > 1, m > 1)

TABLE 2

| | compound (II) | methyl phenyl sulfoxide | trifluoro-methanesulfonic acid | diphenyl amine | phosphorus pentoxide | molar ratio of the diphenyl amine to the phosphorus pentoxide | conversion rate |
|---|---|---|---|---|---|---|---|
| Example 6 | 0.3 g | 0.19 g | 3 ml | 0.23 g | 0.1 g | ~8:1 | 69% |
| Example 7 | 0.3 g | 0.19 g | 3 ml | 0.23 g | 0.4 g | ~2:1 | 89% |
| Example 8 | 0.3 g | 0.19 g | 3 ml | 0.23 g | 0.8 g | ~1:1 | 91% |
| Comparative Example 2 | 0.3 g | 0.19 g | 3 ml | 0.23 g | — | — | ≤5% |

In comparison with Comparative Example 2, besides trifluoromethanesulfonic acid and diphenyl amine, Examples 6-8 further employed phosphorus pentoxide during the polymerization of Compound (II) and methyl phenyl sulfoxide. As shown in Table 2, in comparison with Comparative Example 2, Polyarylene sulfide (PAS) (III) prepared by Examples 6-8 exhibits a relatively high conversion rate. Furthermore, when the molar ratio of the diphenyl amine to the phosphorus pentoxide is within a range from 4:1 to 1:1 (Examples 7-8), the Polyarylene sulfide (PAS) (III) conversion rate (of the methods disclosed in Examples 7-8) can be increased from 69% to more than 89%, in comparison with the method disclosed in Example 6 (wherein the molar ratio of the diphenyl amine to the phosphorus pentoxide is about 8:1).

It will be clear that various modifications and variations can be made to the disclosed methods and materials. It is intended that the specification and examples be considered as exemplary only, with the true scope of the disclosure being indicated by the following claims and their equivalents.

What is claimed is:

1. A method for preparing a polymer, comprising:
subjecting at least one monomer having a structure represented by Formula (I) to a reaction in the presence of sulfonic acid, diphenyl amine, and oxygen-containing phosphide, obtaining a sulfonium salt polymer

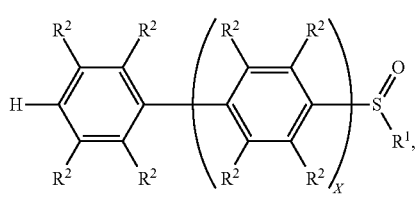

Formula (I)

wherein x is 0, 1, or 2; $R^1$ is $C_{1-6}$ alkyl group; and $R^2$ is independently hydrogen, or $C_{1-6}$ alkyl group, and wherein the molar ratio of the diphenyl amine to the oxygen-containing phosphide is from 4:1 to 1:1.

2. The method as claimed in claim 1, wherein $R^1$ is methyl, ethyl, propyl, isopropyl, n-butyl, t-butyl, sec-butyl, isobutyl, pentyl, or hexyl.

3. The method as claimed in claim 1, wherein $R^2$ is hydrogen, methyl, ethyl, propyl, isopropyl, n-butyl, t-butyl, sec-butyl, isobutyl, pentyl, or hexyl.

4. The method as claimed in claim 1, wherein the sulfonic acid is a compound having a structure represented by Formula (II)

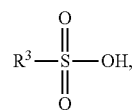

Formula (II)

wherein $R^3$ is hydrogen, $C_{1-6}$ alkyl group, or $C_{1-6}$ fluoroalkyl group.

5. The method as claimed in claim 1, wherein the sulfonic acid is methanesulfonic acid, ethanesulfonic acid, propylsulfonic acid, trifluoromethanesulfonic acid, or a combination thereof.

6. The method as claimed in claim 1, wherein the oxygen-containing phosphide is phosphoric anhydride, polyphosphoric acid, or a combination thereof.

7. The method as claimed in claim 1, wherein the monomer having a structure represented by Formula (I) is

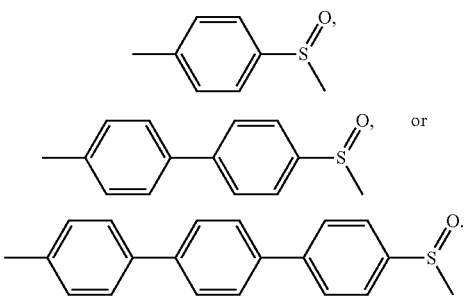

8. The method as claimed in claim 1, wherein the at least one monomer having a structure represented by Formula (I) is

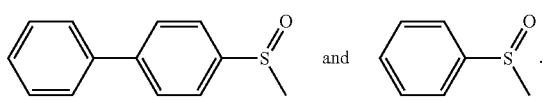

9. The method as claimed in claim 4, wherein the sulfonium salt polymer has at least one repeating unit having a structure represented by Formula (III)

Formula (III)

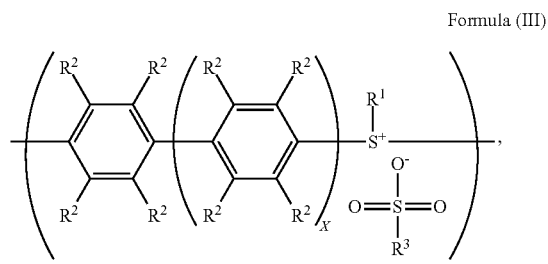

wherein x is 0, 1, or 2; $R^1$ is $C_{1-6}$ alkyl group; $R^2$ is independently hydrogen, or $C_{1-6}$ alkyl group; and, $R^3$ is hydrogen, $C_{1-6}$ alkyl group, or $C_{1-6}$ fluoroalkyl group.

10. The method as claimed in claim 9, wherein the repeating unit having a structure represented by Formula (III) is

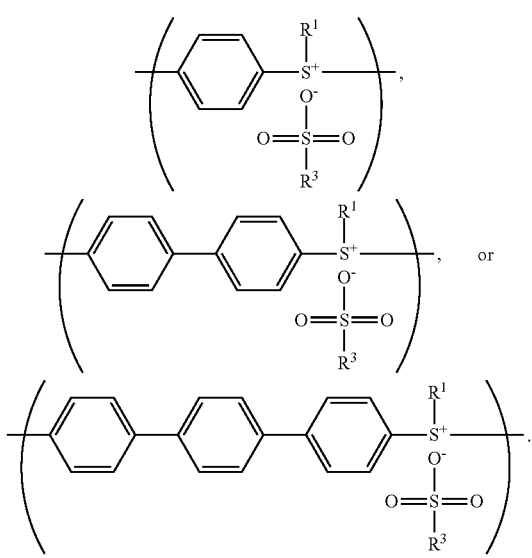

11. The method as claimed in claim 1, wherein the conversion rate of the monomer having the structure represented by Formula (I) to the sulfonium salt polymer is greater than or equal to 80%.

12. The method as claimed in claim 1, further comprising:
reacting a nucleophile with the sulfonium salt polymer, obtaining a polyarylene sulfide.

13. The method as claimed in claim 12, wherein the nucleophile is pyridine, 4-methylpyridine, triethylamine, potassium chloride, methanol, ethanol, dimethylformamide, dimethylacetamide, N-methylpyrrolidone, or a combination thereof.

14. The method as claimed in claim 12, wherein the polyarylene sulfide (PAS) has at least one repeating unit having a structure represented by Formula (IV)

Formula (IV)

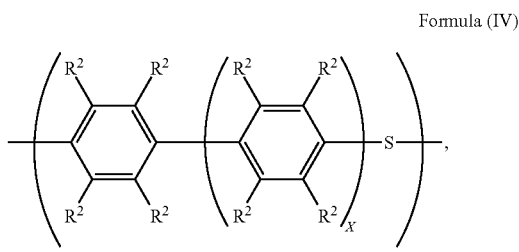

wherein x is 0, 1, or 2; and, $R^2$ is independently hydrogen, or $C_{1-6}$ alkyl group.

15. The method as claimed in claim 14, wherein the repeating unit having a structure represented by Formula (IV) is

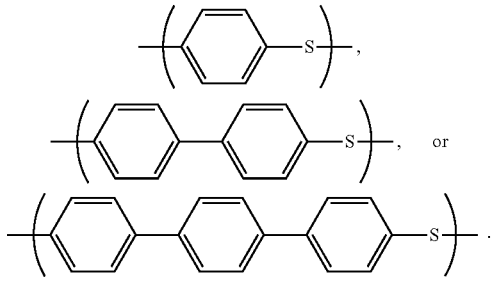

* * * * *